June 13, 1967  E. W. ONULAK  3,324,737
LINK CHAIN
Filed Nov. 18, 1963  4 Sheets-Sheet 1
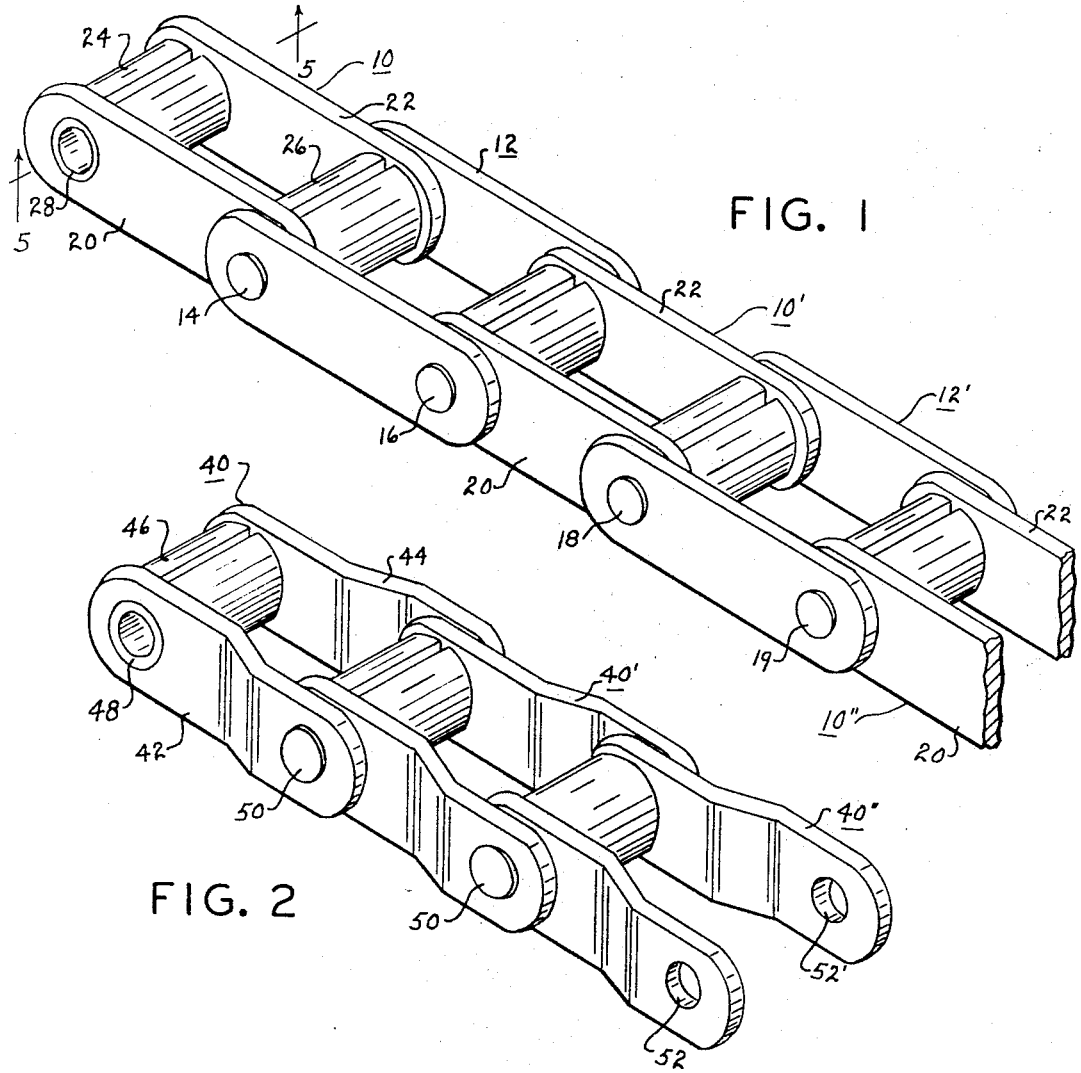
FIG. 1
FIG. 2
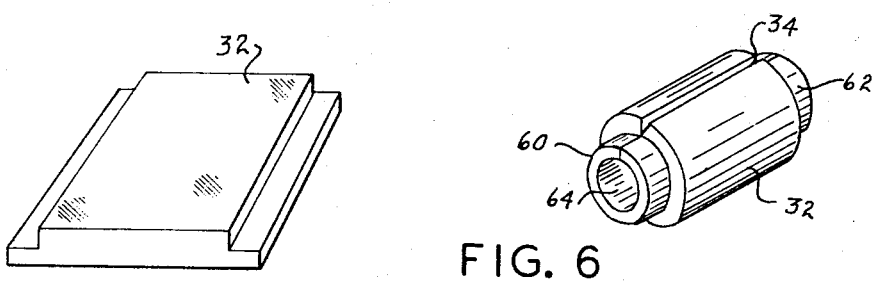
FIG. 7
FIG. 6
INVENTOR.
EUGENE W. ONULAK
BY Hobbs & Easton
ATTORNEYS

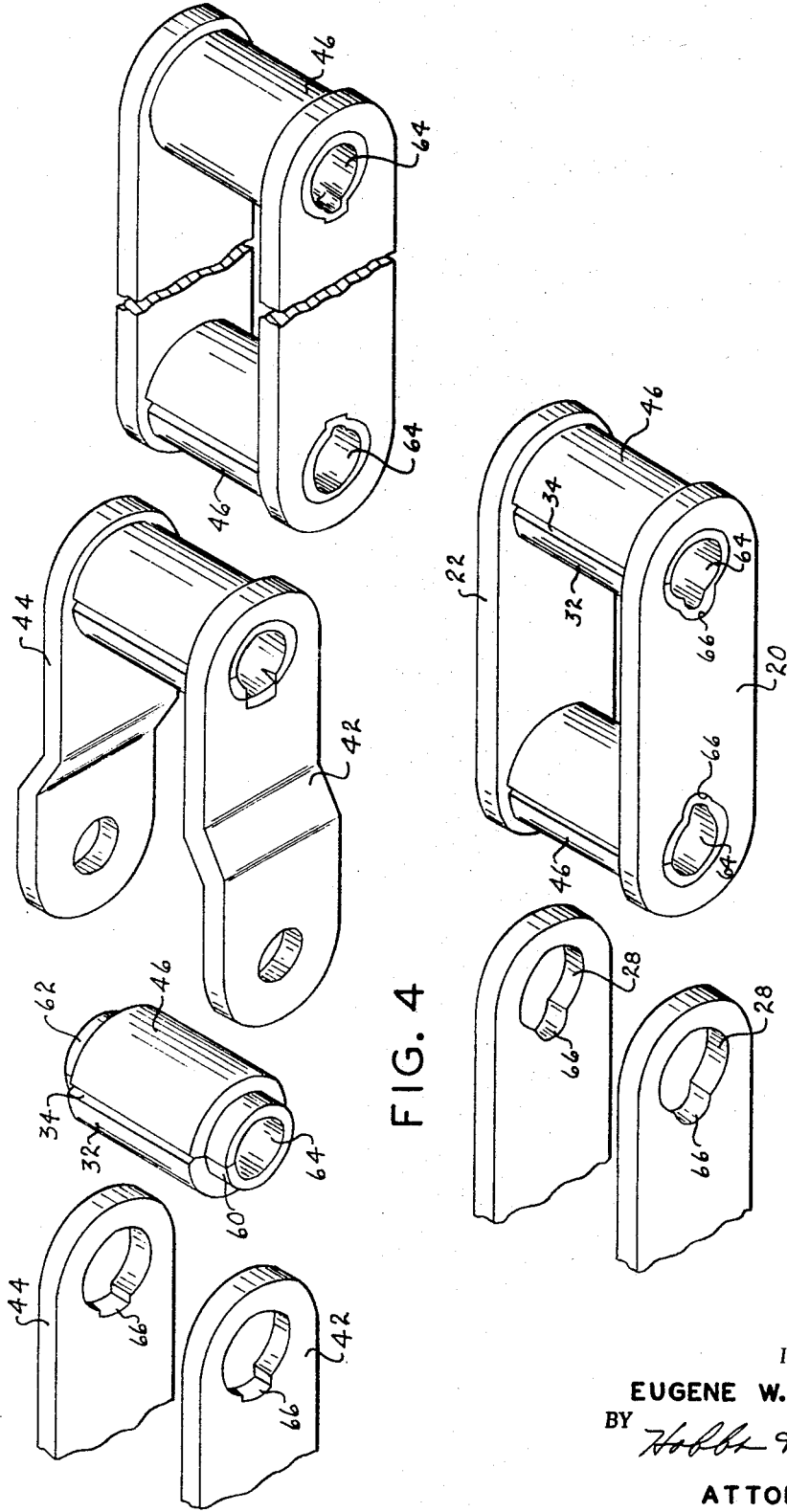

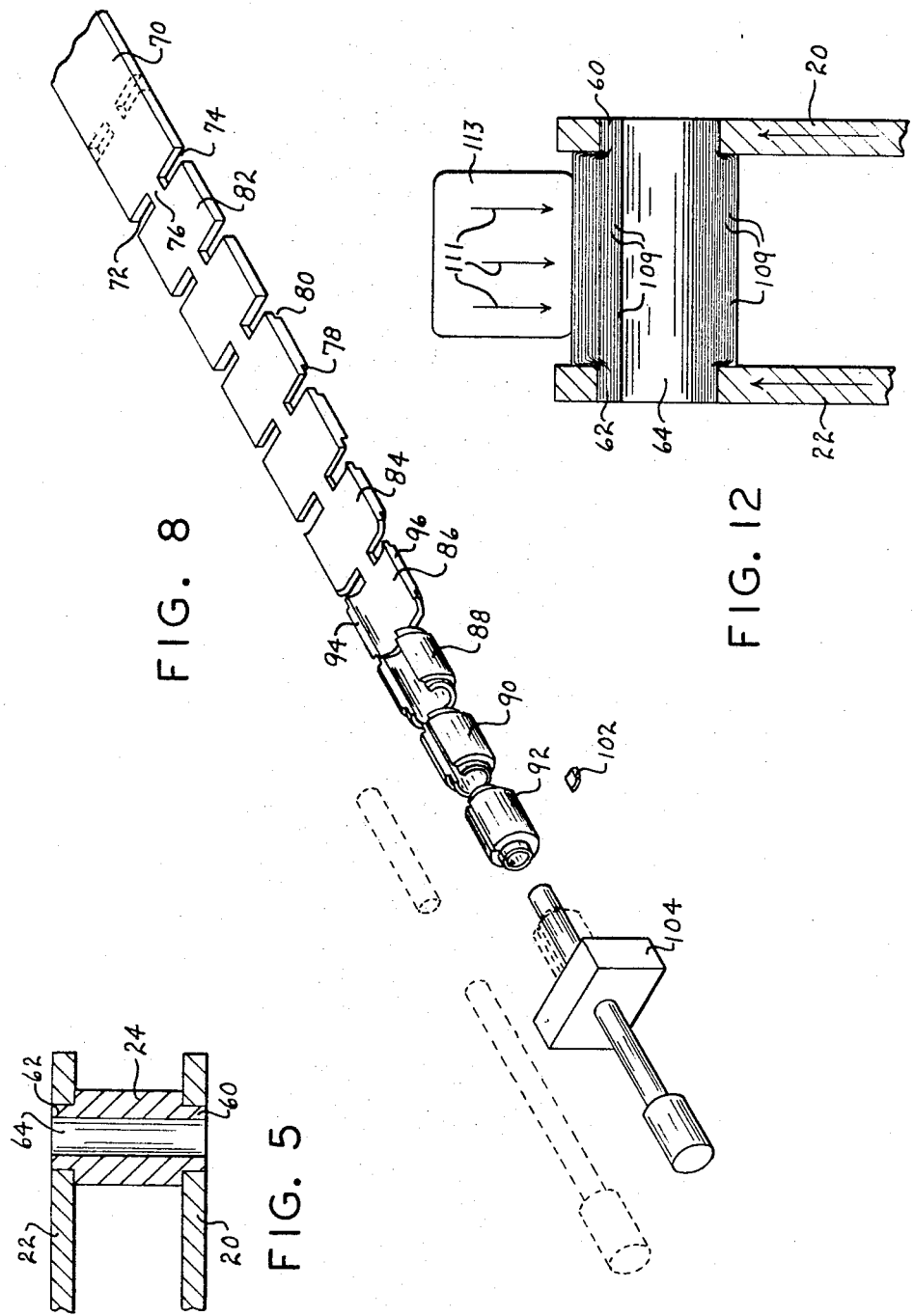

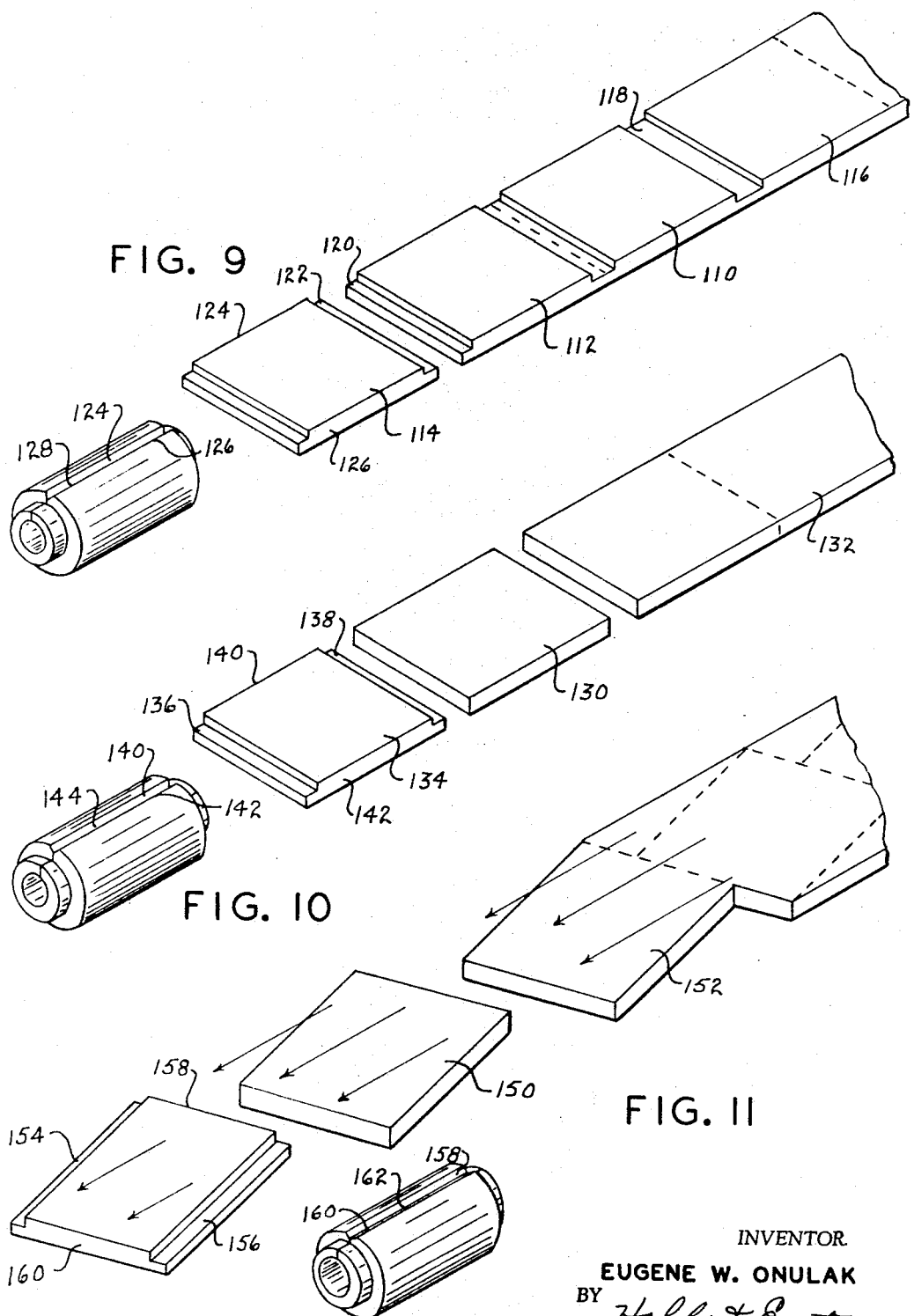

United States Patent Office 3,324,737
Patented June 13, 1967

3,324,737
LINK CHAIN
Eugene W. Onulak, P.O. Box 631,
Huntington, Ind. 46750
Filed Nov. 18, 1963, Ser. No. 324,482
6 Claims. (Cl. 74—255)

The present invention relates to a link chain and more particularly to a chain of this type for use with sprockets in power transmissions and for conveyors.

Link chains have been and are extensively used in the power transmission field and for conveyors, and the conventional chain used in this field consists basically of two spaced parallel side bars with connecting bushings forming one link and two spaced parallel side bars disposed externally of said first bars and pivotally connected by pins at each end of the links of the first type. The bushings engage the teeth of the drive and driven sprockets, and links formed by the respective side bars pivot on the interconnecting pins as the chain traverses the peripheries of the various drive and driven sprockets. In this operation, the bushing inherently slidably engages the sprocket teeth, and friction created between the teeth and bushing causes substantial wear on the bushing, eventually requiring repair or replacement of the chain. The foregoing type of conventional link chain has wide application in many fields, including the industrial, commercial, farm and domestic machinery, vehicles and appliances; however, in the past link chains suitable for these various fields have been too expensive for many applications, have not been sufficiently reliable, or have required excessive service to maintain them in satisfactory operating condition. The cost of the initial installation and the replacement and service requirements have limited the use of the conventional link chain of the foregoing type. It is therefore one of the principal objects of the present invention to provide a relatively simple and easily fabricated link chain of the aforesaid construction which is basically stronger and more wear resistant than the conventional link chain, and which can be fabricated from standard rolled bar stock on conventional or standard metal fabricating machinery.

Another object of the invention is to provide a chain of the aforesaid type, the links of which are fabricated from rolled steel sheet, bar or plate stock, by a coining or forging operation, in which the grain of the stock is arranged parallel to the axis of the bushing, i.e. transverse to the lines of force to which the final chain is subjected in transmitting power and transverse to the shoulders at each end of the bushing.

Still another object of the invention is to provide a link chain, the parts of which are fabricated completely from steel bar stock without any drilling, boring or other machining operation, and which can be fully assembled by simple swaging operations.

Further objects and advantages of the present invention will become apparent from the following description and accompanying drawings, wherein:

FIGURE 1 is a perspective view of a link chain embodying the present invention;

FIGURE 2 is a perspective view of a modified form of a link chain embodying the present invention;

FIGURE 3 is a perspective view giving the details of the preferred embodiment of the present invention;

FIGURE 4 is an exploded perspective view of a modified form of the present invention;

FIGURE 5 is a fragmentary cross sectional view of one of the links of the present link chain, the section being taken on line 5—5 of FIGURE 1;

FIGURE 6 is a perspective view of a fully formed bushing prior to its being assembled in the chain construction;

FIGURE 7 is a perspective view of a blank from which the final bushing is made;

FIGURE 8 is a perspective view of a series of blanks and partially formed bushings, illustrating the steps performed in the bushing forming operation;

FIGURE 9 is a perspective view of the strip, blanks and final bushing illustrating a method in which the bushing is formed;

FIGURE 10 is a perspective view of a strip, blanks and final bushing illustrating a modified form of the method of forming the bushing;

FIGURE 11 is a perspective view of a strip, blanks and final bushing illustrating a further modified form of the method of fabricating the bushing; and FIGURE 12 is a fragmentary cross sectional view of the links similar to that shown in FIGURE 5, illustrating the advantages of the construction of the links of the present chain.

Referring more specifically to the drawings, numerals 10, 10' and 10" designate the primary links of my chain, and numerals 12 and 12' designate secondary links of the chain, the primary and secondary links being connected to one another by pins 14, 16, 18 and 19 extending through the ends of the aforesaid links, as will be more fully described hereinafter.

Primary links 10, 10' and 10" consist of side bars 20 and 22 held rigidly in spaced relation by bushings 24 and 26 secured in holes at opposite ends of the respective side bars. Side bars 20 and 22 are preferably stamped from rolled sheet or bar material, and the holes 28 in opposite ends thereof are preferably pierced from the bars during the stamping operation, the two holes being generally cylindrical in shape, though a recess, groove or other configuration may be provided in the edge of the holes for securing bushings 24 and 26 in place.

The bushings are formed from the bar or sheet material into a cylindrical structure, such as that shown in FIGURES 4 and 6, from a blank such as that shown in FIGURE 7. The blanks form the cylindrical body portion 32 with the two ends of the blank being merely butted together, is illustrated at numeral 34. Since in the present chain construction the bushings do not rotate, a completely closed joint between the two ends is not required. The modified form of chain construction shown in FIGURES 2 and 4 consists of a series of only primary links 40 having side bars 42 and 44 rigidly connected to one another by bushings 46 secured in holes 48 in one end of the two bars. The links 40, 40' and 40" are identical in size, shape and construction, and the various links are connected to one another by pins 50 extending through holes 52 and 52' in the opposite ends of the side bars 42 and 44. The bushings may be the same in any one of the embodiments of the invention thus far described and consist of a cylindrical body 32, reduced diameter portions 60 and 62 on opposite ends of the body and joined integrally therewith, and a hole 64 extending axially through the body 32 and reduced diameter portions 60 and 62.

In the embodiment of the invention illustrated in FIGURE 3, which is basically the same as the structure shown in FIGURE 1, a notch 66 is provided in each of the two side bars 20 and 22, and, after the bushing has been assembled between the two bars with reduced diameter portions 60 and 62 extending into and through holes 28, the reduced diameter portions are swaged sufficiently to cause the metal thereof to flow into notches 66, as shown in the assembled link of FIGURE 3. After the bushings have been assembled between the side bars and the ends of the bushings swaged into the recesses of the side bars, the bushings are locked rigidly in place in holes 28 and the side bars are firmly secured to the ends of the bushings. After the bushings have been assembled in this manner with the slot 34 between the ends of body 32 facing outwardly, the side bars 12 are assembled externally of side bars 20 and 22, respectively, and secured in place by pins 14, 16, 18 and 19, as illustrated in FIGURE 1. The ends of the pins are then swaged or otherwise upset to expand them so that they firmly engage the metal defining the holes in the ends of side bars 12, thereby rigidly holding the side bars 12 in place against the ends of side bars 20 and 22. When the links have been assembled in the foregoing manner, the chain is ready for use and the primary links 10, 10' and 10'' pivot freely on pins 14, 16, 18 and 19 extending through holes 28 of the side bars and holes 64 of the bushings.

One of the primary features of the present invention is the result of the manner in which the bushings of the present chain are formed. The method, which may be either a hot or cold operatioin, is illustrated in FIGURE 8 wherein a strip of sheet metal 70 is fed into a stamping or blanking machine. As the strip passes through the machine, the two opposed notches 72 and 74 are first formed by blanking out the material and leaving a neck 76 therebetween. The next operation performed consists of coining or forging transverse grooves 78 and 80 in the two edges of the blank 82 created by the series of notches 72 and 74. Thereafter, a series of rolling or cupping operations is performed, consisting of the individual steps designated by numerals 84, 86, 88, 90 and 92, in which the blanks 82 are progressively rolled axially until the two ends 94 and 96 are in contact with one another. In the final stages of the operation, a mandrel is inserted in hole 64 of the nearly completed bushing, and the connecting neck 102 is removed from the blanks of steps 90 and 92, thus detaching the formed bushing from the connected series of partially formed blanks. The mandrel reciprocates from the position indicated by broken lines to the position shown in solid lines, and either stripping block 104 moves axially on the mandrel or the mandrel retracts through the stripping block to eject the bushing illustrated in broken lines thereon from the mandrel. The mandrel in conjunction with the press performs the final shaping and sizing operation, and the bushing as it is ejected from the mandrel is fully formed ready to be assembled in the chain structure between the side bars 20 and 22, as previously described.

One of the principal features of the present invention is the orientation of the grain or crystalline structure of the metal forming the bushings. The transverse arrangement of the grain in the bushing, i.e. the orientation of the grain in a direction axial to the axis of the bushing, is obtained by the method employed in the fabrication of the bushing. The bushings are formed from blanks lying crosswise of the direction in which the strip of sheet material was rolled, the blanks being rolled or formed axially lengthwise of the strip; thus the greatest strength of the metal in the bushing is utilized where it will produce the greatest strength in the final chain link. FIGURE 12 illustrates the direction of forces applied to the bushing in use and shows diagrammatically at numerals 109 the orientation of the grain in the bushing. Thus, it is seen that the grain lying axially with the axis of the bushing is transverse to the lines of forces applied to the chain, as indicated by numeral 111 in sprocket tooth 113. This greatly strengthens the bushing, particularly at the greatest reduced diameter portions 60 and 62 which are subjected to the full force applied by the side bars to the bushing.

FIGURE 9 illustrates a modified form of the method employed in forming the present bushing, the method consisting in partially forming the blanks 110, 112 and 114 from a strip of sheet or bar material 116. The first step consists in coining or forging a groove 118, and the second step consists in severing the two adjacent blanks in the middle of the groove, thus providing shoulders 120 and 122 on the edges of the blanks for forming the reduced diameter portions. After the blank has been formed in the foregoing manner, it is rolled by any suitable rolling or cupping operation until the ends 124 and 126 are in abutment, as illustrated by numeral 128.

A further modified method for forming the present bushing is illustrated in FIGURE 10, in which blanks 130 are severed from a strip of sheet material 132 without any coining, forging or other forming operation having been performed on the blank before it is severed from the strip. Thereafter, the blank, as illustrated at numeral 134, is coined or forged to form shoulders 136 and 138 for forming the reduced diameter portion of the final bushing. The bushing is then rolled, causing ends 140 and 142 to abut one another, as indicated at numeral 144.

A further modification in the method of fabricating the bushing is illustrated in FIGURE 11. This method may be substantially the same as either of the two illustrated in FIGURES 9 and 10 and could be embodied in the method illustrated in FIGURE 8. The primary difference in the modified method illustrated in FIGURE 11 and those previously described consists in blanking the blanks for the bushings at an angle, for example 45°, to the direction of the grain, and thereafter forming the bushing, the arrows indicating the orientation of the grain. This operation consists in severing a series of blanks 150 from a strip of material from sheet or plate material 152 and thereafter forming shoulders 154 and 156 from the severed blank. The blanks are then rolled by a forming operation to the position shown with the ends 158 and 160 abutting one another, as illustrated at numeral 162. The bushing with this type of grain orientation may under certain conditions have optimum strength and maximum wear.

After the bushings have been formed by the foregoing method or any one of the modifications, the side bars 20 and 22 are assembled on reduced diameter portions 60 and 62, and a portion of each end of the bushing is swaged into recesses 66. The recess shown in FIGURE 3 has smooth or rounded side walls, whereas the recess in FIGURE 4 has substantially radially extending side walls, the only significant advantage between the two forms of notches being in the greater ease with which the notches shown in FIGURE 4 can be formed by the conventional stamping operation. In smaller size links the holes 28 may be round, i.e., without either type of notches 66 since the smaller bushings do not tend to rotate in the holes. In any of the embodiments described herein, both the bushings and side bars may be fabricated by either hot or cold operations and the two joined, i.e. the ends of the bushing expanded in the holes in the side bars, by hot or cold operations, or any combination thereof.

While several modifications of the present link chain have been described herein and a method with certain variations has been illustrated, changes may be made in both the construction of the chain and in the method without departing from the scope of the invention.

I claim:
1. A link chain, comprising two elongated side bars having a hole in each end with a rounded notch in the side thereof and being spaced in parallel relation to one another, a steel bushing between said side bars at each end thereof, each of said bushings having an axially positioned hole therethrough and an elongated cylindrical body portion with an axially positioned slit along one side, a reduced diameter portion at each end thereof forming annular shoulders engaging the internal side of said bars adjacent the holes therein, each of said reduced diameter portions extending into the hole in one end of said side bars and having a deformed portion extending into the respective notch, the crystalline structure in the steel of said bushings being oriented in the direction parallel with the axis of said bushing and being continuous from said cylindrical portion into said reduced diameter portions, a pair of bars externally of said first mentioned bars and having holes near one end thereof in alignment with the hole in one of said bushings, and a pin extending through the hole in said one bushing and the holes in said last mentioned bars.

2. A link chain, comprising two side bars having a hole in each end with a notch in the side thereof and being spaced in parallel relation to one another, a steel bushing between said side bars at each end thereof, each of said bushings having an axially positioned hole therethrough and an elongated cylindrical body portion with an axially positioned slit along one side, a reduced diameter portion at each end thereof forming annular shoulders engaging the internal side of said bars adjacent the holes therein, each of said reduced diameter portions extending into the hole in one end of said side bars and having a deformed portion extending into the respective notch, the crystalline structure in the steel of said bushings being oriented in the direction substantially parallel with the axis of said bushing and being continuous from said cylindrical portion into said reduced diameter portions, a pair of bars externally of said first mentioned bars and having holes near one end thereof in alignment with the hole in one of said bushings, and a pin extending through the hole in said one bushing and the holes in said last mentioned bars.

3. A link chain, comprising two side bars having a hole in each end with a notch in the side thereof and being spaced in parallel relation to one another, a metal bushing between said bars at each end thereof, each of said bushings having an axially positioned hole therethrough and an elongated cylindrical body portion with an axially positioned slit one side, a reduced diameter portion at each end thereof forming annular shoulders, each of said reduced diameter portions extending into the hole in one end of said side bars and having a deformed portion extending into the respective notch, the grain in the metal of said bushings being oriented in the direction parallel with the axis of said bushing and being continuous from said cylindrical portion into said reduced diameter portions, a pair of bars externally of said first mentioned bars and having holes near one end thereof in alignment with the hole in one of said bushings, and a pin extending through the hole in said one bushing and the holes in said last mentioned bars.

4. A link chain, comprising two side bars having a hole in each end, a metal bushing between said side bars, said bushing having an elongated cylindrical body portion with an axially positioned slit along one side and an axial hole therethrough, a reduced diameter portion on each end of said bushing disposed in the respective hole in said side bars and forming annular shoulders, the crystalline structure in the metal of said bushing being oriented in the direction substantially parallel with the axis of said bushing and being continuous from said cylindrical portion into said reduced diameter portions, a pair of bars externally of said first mentioned bars and having holes near one end thereof in alignment with the hole in one of said bushings, and a pin extending through the hole in said bushing and holes in said last mentioned bars.

5. A link chain, comprising two side bars having a hole in each end with a notch in the side thereof, a steel bushing between said side bars, said bushing having an elongated cylindrical body portion with an axially positioned slit along one side and an axial hole therethrough, a reduced diameter portion on each end of said bushing disposed in the respective hole in said side bars and forming annular shoulders engaging the internal side of said bars adjacent the holes therein, the crystalline structure in the steel of said bushing being oriented in the direction substantially parallel with the axis of said bushing and being continuous from said cylindrical portion into said reduced diameter portions, a pair of bars externally of said first mentioned bars and having holes near one end thereof in alignment with the hole in one of said bushings, and a pin extending through the hole in said one bushing and the holes in said last mentioned bars, said last mentioned bars having sections offset inwardly with holes near the free end thereof for receiving a bushing.

6. A link chain, comprising two side bars having a hole in each end, a metal bushing between said side bars, said bushing having an elongated cylindrical body portion with an axially positioned slit along one side and an axial hole therethrough, a reduced diameter portion on each of said bushing disposed in the respective hole in said side bars and forming annular shoulders, the crystalline structure in the metal of said bushing being oriented in the direction substantially parallel with the axis of said bushing, a pair of bars externally of said first mentioned bars and having holes near one end thereof in alignment with the hole in one of said bushings and being continuous from said cylindrical portion into said reduced diameter portions, and a pin extending through the hole in said one bushing and the holes in said last mentioned bars, said last mentioned bars having sections offset inwardly with holes near the free end thereof for receiving a bushing.

References Cited

UNITED STATES PATENTS

| | | | |
|---|---|---|---|
| 373,983 | 11/1887 | Jeffrey | 74—255 |
| 528,622 | 11/1894 | Teale | 74—255 |
| 1,221,617 | 4/1917 | Sorber | 74—255 |
| 1,308,843 | 7/1919 | Davis | 74—255 |
| 1,402,766 | 1/1922 | Hay | 74—255 |
| 1,925,055 | 8/1933 | Mize | 74—255 |
| 2,105,048 | 1/1938 | Lauenstein et al. | 74—255 X |

DAVID J. WILLIAMOWSKY, *Primary Examiner.*

J. A. WONG, *Assistant Examiner.*